Patented July 8, 1924.

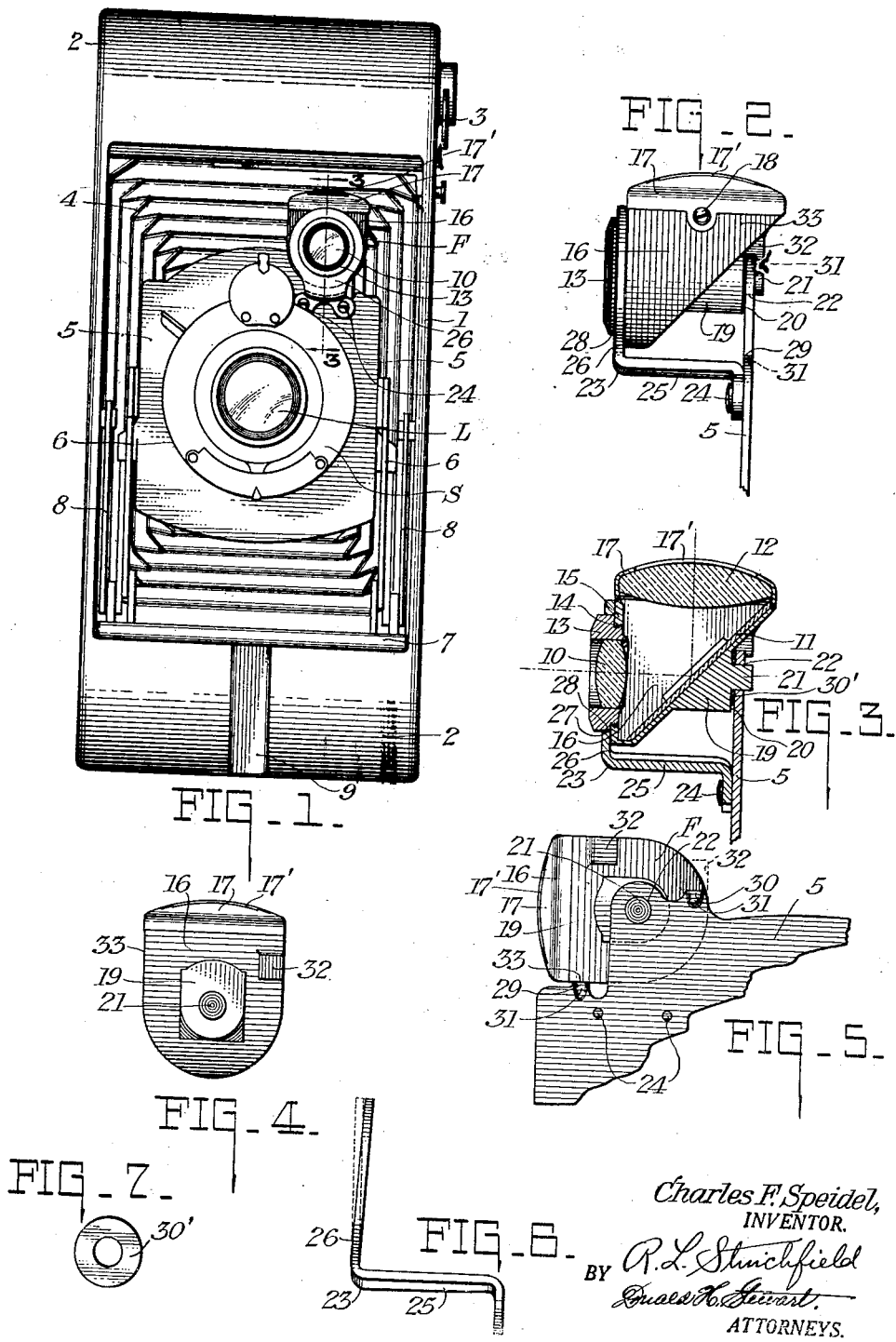

1,500,344

UNITED STATES PATENT OFFICE.

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

VIEW FINDER.

Application filed May 10, 1922. Serial No. 559,846.

*To all whom it may concern:*

Be it known that I, CHARLES F. SPEIDEL, a citizen of the United States of America, residing at Rochester, in the county of Monroe and State of New York, have invented certain new and useful Improvements in View Finders, of which the following is a full, clear, and exact specification.

My present invention relates to photography, and more particularly to view finders for cameras for the purpose of ascertaining the field of view which will be included in the completed picture.

One object of my invention is to provide a cheap and efficient means for mounting the finder upon a support, so that it may be available for either horizontal or vertical views when turned to different positions. Another object is to provide a finder and mount which can be quickly and easily assembled. Another object is to provide a supporting bracket for the finder which includes in the single piece a spring tension tending to hold the finder in its set position. Another object is to provide a two-point bearing upon which the finder turns to insure the proper registration of the finder image with the field of view included by the camera. Still another object is to provide a mount for the finder which will utilize the space required in the camera for the lens and shutter. To these and other ends the invention resides in certain improvements and combinations of parts, all as will be hereinafter fully described, the novel features being pointed out in the claims at the end of the specification.

In the drawings, in which like parts are designated by like reference characters throughout:

Fig. 1 is a front elevation of a camera equipped with a finder constructed in accordance with, and illustrating, one form of my invention;

Fig. 2 is a side elevation of the finder and support removed from the camera;

Fig. 3 is a fragmentary section taken on line 3—3 of Fig. 1;

Fig. 4 is an elevation of the back of the finder;

Fig. 5 is a view similar to Fig. 4, but including a portion of the lens board;

Fig. 6 is a side elevation of the finder bracket, and

Fig. 7 is a perspective of a washer which may be used.

As a particular instance of the use of my improved finder, I have illustrated it as built into a compact roll film camera of the type wherein the latent image produced on the photographically light sensitive medium is of oblong shape, so that the finder must be turned through 90° when a horizontal picture is to be taken after making a vertical one. Certain features of my invention can, however, be applied with equal facility to other types of film or plate cameras regardless of the shape or dimensions of the picture area.

In Fig. 1 I have illustrated, by way of example, a thin folding camera, since this is the most difficult to properly equip with a finder. The camera body 1 has rounded ends 2 which enclose the film spools, there being a winding key 3 by which the film is positioned for the various exposures. A bellows 4 connects the exposure frame of the camera body 1 to a lens board 5 which also forms a support for a finder, designated broadly as F. Suitable links 6 hold the support 5 erect upon a bed 7 retained in open position by braces 8. The usual leg 9 supports the camera upon a flat surface.

The finder includes an optical system consisting of a front lens 10, a mirror 11 and a viewing or magnifying lens 12. Lens 10 is held by a cell 13 which is threaded at 14 and screwed into the front 15 of the finder box 16, which, in this instance, is made in one piece by die-casting. A cover plate 17 retains lens 12 in position, this plate being cut in the shape of a cross at 17′ to form a mask limiting the field of the finder to that of the camera, it being understood that one portion of the cross is used for horizontal and the other for vertical views, as is customary in view finders. A screw 18 on each side of plate 17 retains this member in position on the finder box 16.

The back of the finder is slanting to form a base for mirror 11, but there extends rearwardly from the finder box a lug 19 having a face 20 parallel to the front 15. A pin or protuberance 21 is formed on this member and serves as one of the pivots by which the finder is supported. The rear of the finder box is supported by pin 21 passing through an aperture 22 in support 5, which is on the axis of lens 10. There is a cast up lug 32 on the finder which strikes against a lug 30 on the lens board when the finder is upright for vertical pictures (Figs. 1 and 4), and the side 33 of the finder strikes lug 29 as a limiting stop governing the position necessary for taking horizontal pictures (Fig. 5).

Each of the stop lugs, 29—30, is preferably raised from the metal of support 5; and in this case I accomplish this by striking with a tool to force up the metal by reducing the thickness thereof, as is shown at 31, Figs. 5 and 2. The object of this is that more accurate positions can be thus obtained, and further, that where adjustments are necessary to register the view in the finder with that of the camera, these small protuberances can be readily filed down. Such adjustments are, however, rarely used.

The front 15 of the finder box is supported by a bracket 23, which serves a double purpose; that of providing the necessary spring tension to frictionally hold the finder box in either set position and that of supporting the front of the finder in alignment with the rear support. The bracket is made of metal of the shape best illustrated in Figs. 1 and 6. When the screws 24 are positioned, the finder causes the metal to spring from the full line position in Fig. 6 to that shown in dashed lines, so that, as can readily be seen, the finder is frictionally engaged as well as supported by the bracket. Shank 25 is curved in cross section, lending the strength to this part of the bracket which is necessary to insure accurate alignment. The front 26 of the bracket is apertured at 27 to surround the smooth periphery 28 of the tube 13 carrying lens 10. This tube forms the second pivot which supports the finder box.

The finder box 16 is held against displacement by the support and bracket which form bearings 22 and 27 for the axes 21 and 28 of the finder. The friction caused by bracket 23 is sufficient to retain the finder in either of its two operative positions, but not too great to prevent conveniently free movement of the finder about its axis. The lens L and shutter S are mounted on the front of the lens board, as shown in Fig. 1. By my method of mounting the finder the space partly utilized in the camera for enclosing the lens and shutter when the camera is closed; can be also used for the finder, so that a block finder can be used instead of a finder of the folding type.

In assembling, the camera and finder can be separately assembled, and the finder attached to the camera by merely entering pin 21 in slot 22, placing bracket 23 in position and fastening it to the support 5 with screws 24. Thus the spring tension is automatically cared for during the assembling operation. In the rare cases where there is excessive shrinking of the die cast body 16, a thin washer 30' can be added if desired to increase the spring tension, by placing it on pin 21. This is preferable to bending the bracket because the bracket is accurately designed to retain the finder lens axis in proper alignment with that of the objective L, so that, for best results, the shape should not be altered.

Having thus described my invention, what I claim as new and desire to secure by Letters Patent is:

1. In a view finder, the combination with a support including a lens board, of a second support comprising a bracket, a finder box interposed between and adapted to turn upon the two supports, and means included in said bracket for exerting a yielding pressure upon the finder box whereby it will be frictionally retained in a set position.

2. In a view finder, the combination with a support including a lens board, of a second support consisting of a bracket, a finder box interposed between the two supports, the bracket being adapted to retain the finder box in position.

3. In a view finder, the combination with an apertured support, of a bracket with an apertured end, a finder box, and projections on the finder box extending into the apertures of the support and the bracket, whereby the finder box is movably supported between the two.

4. In a view finder, the combination with a supporting plate, of a bracket attached to the supporting plate and having a portion of said bracket spaced from the plate, parts on the view finder adapted to co-operate with the supporting plate and with the bracket, whereby the finder is frictionally supported between these parts.

5. In a view finder, the combination with a finder box having a front lens, of a cell for retaining the lens in the finder, a protuberance on the finder spaced from the lens but in axial alignment therewith, an apertured support and an apertured bracket, the lens cell passing through one aperture and the protuberance passing through the other aperture.

6. In a view finder, the combination with a finder box having a front lens, of a cell for retaining the lens in the finder, a protuberance on the finder spaced from the lens but in axial alignment therewith, an apertured support and an apertured bracket, the lens cell forming one pivot by passing through the aperture in the bracket, and the protuberance forming the other pivot by passing through the apertured support, the bracket yieldingly pressing upon the finder box to frictionally hold it in any set position when turned upon its pivots.

7. In a finder, the combination with a finder box, of means for carrying the finder box comprising a support, and a bracket attached to the support, co-operating parts on the finder, support and bracket for movably carrying the finder, and stops on the support to limit the movement of the finder in two directions.

8. In a finder, the combination with a finder box having sides and rear walls, of means for carrying the box comprising a support and a bracket attached to the support and having an end spaced therefrom, pivotal connections between the finder box, the support and the bracket, stops formed on the support for limiting the movement of the finder as it is turned about its pivots, one side wall of the finder contacting with one stop to limit its movement in one direction, and the rear wall of the camera striking the other stop to limit the movement of the finder in the other direction.

9. In a finder, the combination with a finder box having front and rear walls, of pivots on these walls, a support and a bracket, of bearings in the support and the bracket to receive the pivots of the finder box, the bracket being attached to the support and flexed when assembled, whereby a yielding pressure is created between the finder and its bearings to frictionally retain the finder in a set position.

Signed at Rochester, New York, this 8th day of May, 1922.

CHAS. F. SPEIDEL.